(12) United States Patent
Marsiglio et al.

(10) Patent No.: US 6,755,669 B2
(45) Date of Patent: Jun. 29, 2004

(54) ELONGATED ELASTOMERIC CONNECTOR AND METHOD

(75) Inventors: Carl M. Marsiglio, Spencerport, NY (US); Robert L. Fuss, Spencerport, NY (US)

(73) Assignee: General Motors Corporation, Detroit, MI (US)

( * ) Notice: Subject to any disclaimer, the term of this patent is extended or adjusted under 35 U.S.C. 154(b) by 23 days.

(21) Appl. No.: 10/300,287

(22) Filed: Nov. 20, 2002

(65) Prior Publication Data

US 2004/0097110 A1 May 20, 2004

(51) Int. Cl.[7] .................................................. H01R 4/58
(52) U.S. Cl. ............................................. 439/86; 439/591
(58) Field of Search ............................ 439/86, 91, 591, 439/592, 586

(56) References Cited

U.S. PATENT DOCUMENTS

| | | | |
|---|---|---|---|
| 5,272,017 A | 12/1993 | Swathirajan et al. | |
| 5,316,871 A | 5/1994 | Swathirajan et al. | |
| 5,340,318 A | * 8/1994 | Kunihiro | 439/66 |
| 5,763,113 A | 6/1998 | Meltser et al. | |
| 5,857,858 A | * 1/1999 | Gorowitz et al. | 439/86 |
| 6,338,629 B1 | * 1/2002 | Fisher et al. | 439/66 |
| 6,561,823 B1 | * 5/2003 | Konno | 439/91 |

FOREIGN PATENT DOCUMENTS

EP    1 001 666 A2    5/2000

* cited by examiner

Primary Examiner—Gary F Paumen
(74) Attorney, Agent, or Firm—Gary W. Brooks; Linda M. Deschere (57) ABSTRACT

Recesses are located along an elongated elastomeric member. Electrical contacts are associated with the elastomeric member in registration with the recesses. The elastomeric member expands or compresses along its length to receive one of the closely spaced plates in each of the plurality of recesses and to thereby register the electrical contacts with a corresponding contact point on the plates. The elastomeric strip is confined under compression between two adjacent members which may be parts of two plates or of a single plate. The adjacent members define a recess, including locking protrusions, adapted to resist removal of the connector from within the retention recess unless the elongated elastomeric strip is compressed. An associated method optionally includes allowing the compressed elastomeric strip to push against adjacent members to generate a force which pushes the contact points against the one of the closely spaced plates.

20 Claims, 11 Drawing Sheets

ELONGATED ELASTOMERIC CONNECTOR AND METHOD

FIELD OF THE INVENTION

The present invention relates to an electrochemical fuel cell assembly including a cell voltage monitor; and more particularly to an electrical connecting device which may be used to monitor cells within a stack.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A typical PEM fuel cell and its membrane electrode assembly (MEA) are described in U.S. Pat. Nos. 5,272,017 and 5,316,871, issued on Dec. 21, 1993 and May 31, 1994, respectively, and assigned to General Motors Corporation, assignee of the present invention, and having as inventors Swathirajan et al.

A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In most fuel cell assemblies, current is drawn from the fuel cell stack via a pair of bus plates, one of which is positioned at each end of the fuel cell stack. The fuel cells are stacked between the bus plates, which are typically made of copper or coated copper. Very often individual cells of the stack are contacted for monitoring individual cell voltages or currents, and/or for control or charging/discharging purposes. In most cases, these electrical contacts are not intended to carry the entire stack current, but are capable of providing electrical connection to individual fuel cells or clusters within a stack.

In mass production, an electrical connecting device is needed which is easy to handle and to install, and which provides reliable electrical contact with certain components of a fuel cell stack. It may be desirable to provide, in a single device, groups of contacts that always communicate with the same type of fuel cell component within the stack, or which contact the fuel cell stack at regularly spaced intervals along the length of the stack.

One problem with monitoring individual fuel cells or clusters of cells within a stack is the difficulty of attaching an electrical connector to the electrically conductive elements. For example, for a fuel cell which is designed to generate significant power output, a large number of bipolar plates are provided which require a large number of connections. Perhaps more importantly these connectors are being attached to plates located in close proximity to each other and with distances between the plates that vary from one plate to the next. All of this makes it difficult to make electrical connections.

It is particularly difficult to make connections using a connector capable of encompassing a large number of plates. Although the plates have a substantially uniform spacing therebetween, this spacing between the plates can vary slightly within acceptable tolerances. These slight differences in the spacing from one plate to the next can result in meaningful differences between the theoretical location of a particular plate and the actual location of that plate due to tolerance stack-ups. Thus, individual prior art connectors have typically been limited to connection with a relatively small number of successive plates to minimize the effect of tolerance stack-ups; for example, 8 to 16. Consequently, a single electrical connector which is capable of connecting with the closely spaced plates along the entire length, or at least a significant part of the length, of a fuel cell by adjusting for tolerance stack-ups is desired.

SUMMARY OF THE INVENTION

In accordance with a first aspect of the present invention, a connector for electrically connecting to a series of closely spaced plates having a substantially uniform spacing therebetween is provided. A plurality of recesses are located along the length of an elongated elastomeric member. A plurality of electrical contacts is also included and each of the plurality of contacts is associated with the elastomeric member in registration with one of the plurality of recesses. The elongated elastomeric member is adapted to expand or compress along its length to receive one of the closely spaced plates in each of the plurality of recesses and to thereby register each of the plurality of electrical contacts with a corresponding contact point on one of the closely spaced plates.

In accordance with yet another aspect of the present invention, a connector for electrically connecting a series of closely spaced plates is provided which includes an elongated elastomeric strip adapted to adjust to any tolerance variation in the substantially uniform spacing between the plates. A segment of the elastomeric strip is confined under compression between two adjacent members. The two adjacent members are either two adjacent closely spaced plates or two adjacent members of a single plate.

In accordance with another aspect of the present invention, a method of providing electrical connection to a series of closely spaced plates is provided. The method includes associating a plurality of electrical contact points with an elongate elastomeric strip. A segment of the elongate elastomeric strip is compressed and the compressed segment is placing between a pair of adjacent members of the series of closely spaced plates. At least one of the plurality of contact points is located in contact with one of the closely spaced plates by allowing the compressed segment to push against the pair of adjacent members to generate a force which pushes at least one of the plurality of contact points against the one of the closely spaced plates.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
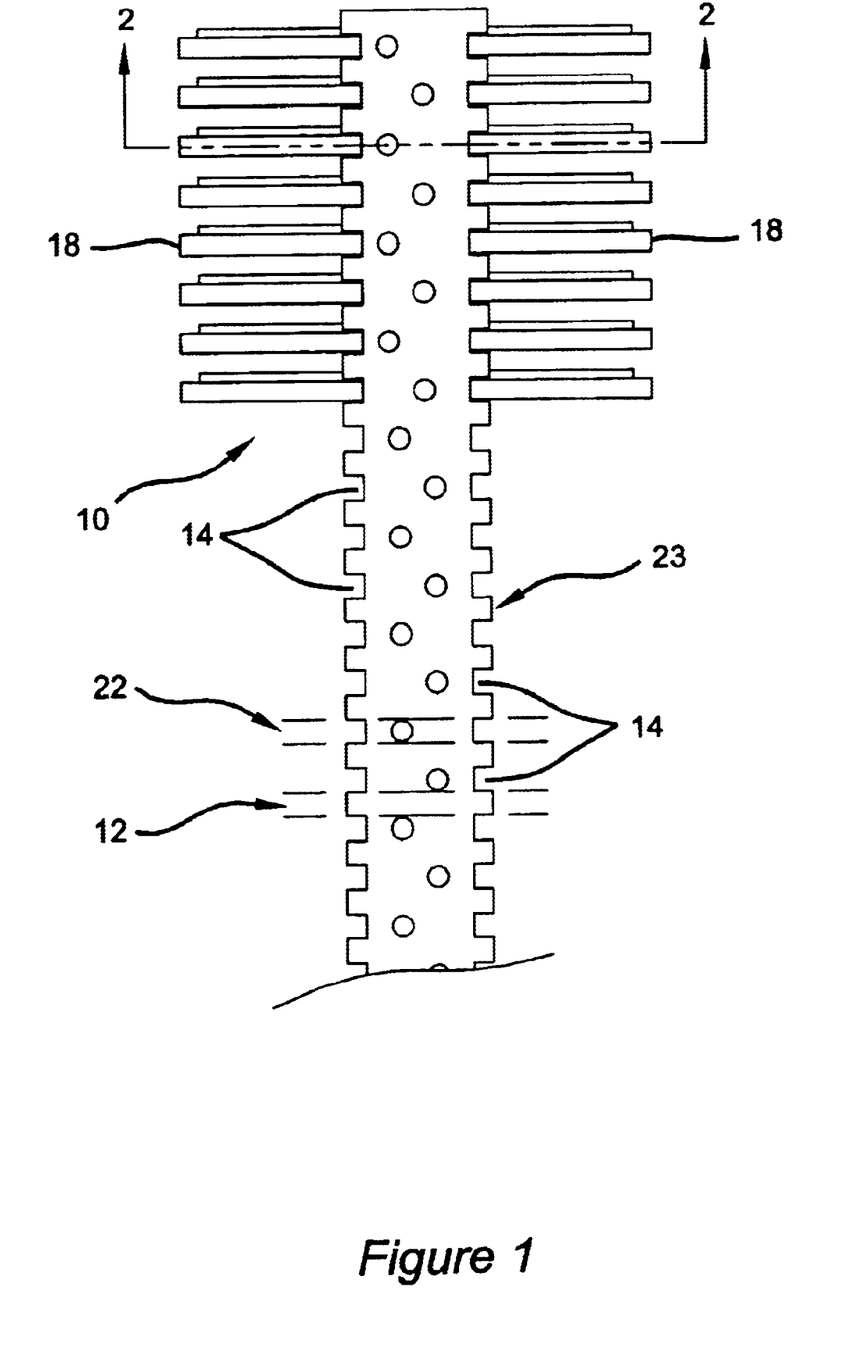
FIG. 1 is a fragmentary top plan view of a first preferred embodiment of the elastomeric connector for a fuel cell stack cell voltage monitor of the present invention.
Figure 2:
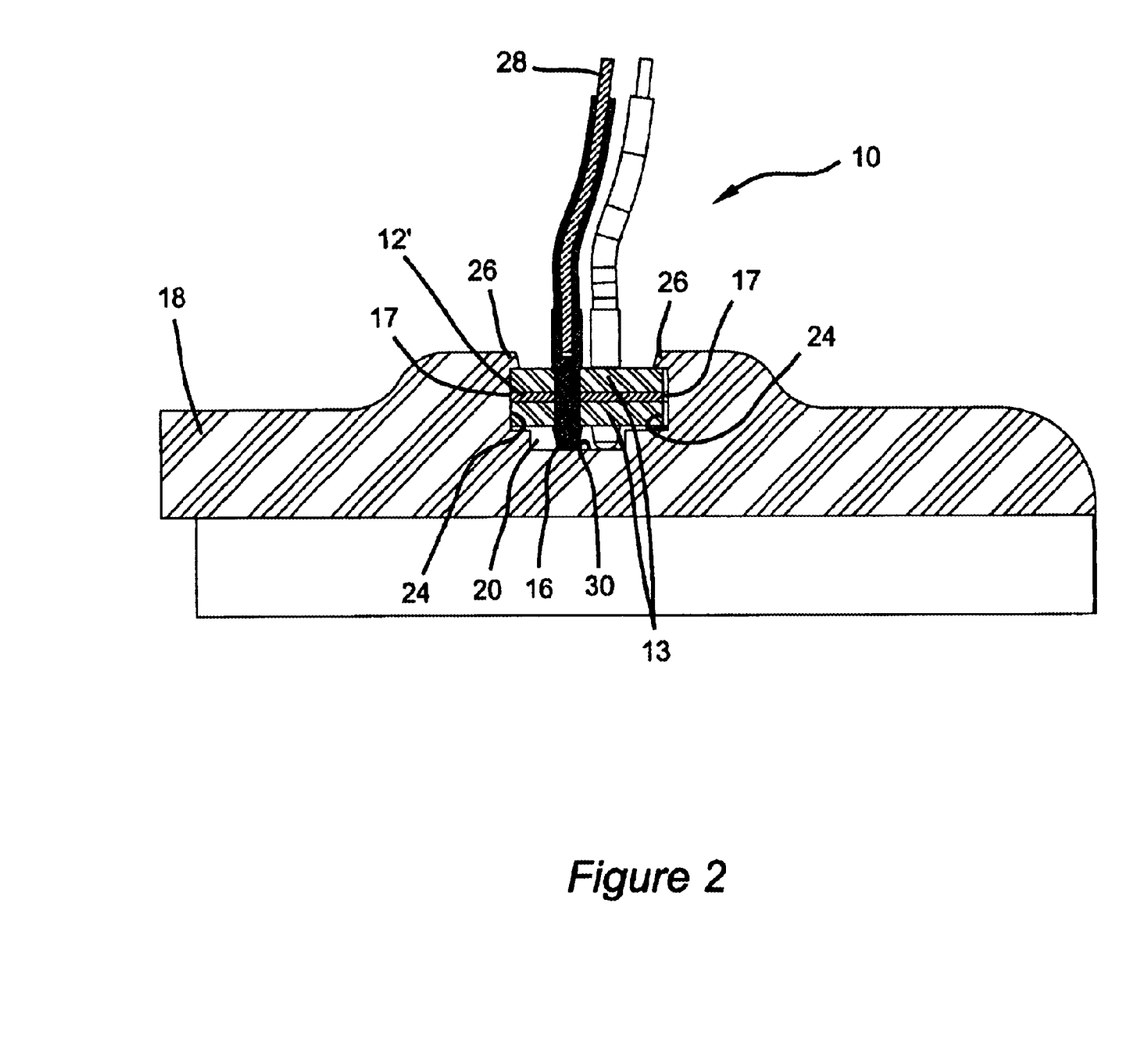
FIG. 2 is a fragmentary cross-sectional view taken along line 2—2 of FIG. 1.

Referring to FIGS. 1 and 2, a preferred embodiment of a connector according to the present invention, indicated generally as 10, is provided. The connector 10 includes an elongated elastomeric strip 12 (or member) with a plurality of recesses 14 and a plurality of electrical contacts 16, 17 associated with the elastomeric strip 12 in registration with the recesses 14. This connector 10 is useful in providing electrical connection to a plurality of closely (between recess 14 pairs, each on opposite sides of the elastomeric strip 12) spaced plates 18. Each plate 18 includes a retention recess 20 into which a segment 22 of the elastomeric strip 12 are adapted to be located. The retention recesses 20 include oppositely disposed sides 24 which operate as adjacent members.

The elastomeric strip 12 of this preferred embodiment has a plurality of recesses 14 formed in pairs along opposite side edges. The recesses 14 are adapted to receive adjacent members 24 of one of the closely spaced plates 18. Thus, the opposing side members 24 of the retention recess 20 operating as adjacent members are received in each of the pairs of recesses 14 of the elastomeric strip 12. As a result of this, the electrical contacts 16, 17 (which are in registration with the recesses 14 of the elastomeric strip 12) are placed into registration with the corresponding plate 18. Thus, a segment 23 (between successive pairs of recesses 14) of the elastomeric strip 12 is adapted to be stretched or compressed as the spacing between the plates 18 varies due to tolerance variations.

The retention recess 20 of each of the closely spaced plates 18 is adapted to accommodate and retain the connector 10, in this case, the segment 22 or the elastomeric strip 12. The retention is accomplished by providing a narrowed segment of the retention recess 20 using locking protrusions 26 which, upon insertion of the connector 10 into the retention recess 20, are located in contact with the upper surface of the elastomeric member 12. The locking protrusions 26 maintain the connector 10 in place by providing a reduced dimension of the retention recess 20 between the locking protrusions 26. This requires that the elastomeric strip 12 be compressed before it can be removed from the retention recess 20.

The elastomeric strip 12 of this embodiment has outer support or insulation barriers 13 which sandwich an internal electrically conductive material 12'. This internal electrically conductive material 12' is conductive through its width (or X direction), but is not meaningfully electrically conductive in use along its elongated length (or Z direction as seen in FIG. 2). This electrically conductive material 12' may also be conductive along its height (or Y direction as seen in FIG. 2). Not meaningfully electrical conductive in use means that at the operating condition (i.e., voltage and power required to accomplish the monitoring) the current will not flow longitudinally along the elastomeric strip 12 such that there would be any unacceptable interference between adjacent electrically conductive paths through the electrically conductive material 12'; and preferably, that at the operating conditions there is no electrical current flow between adjacent electrically conductive paths.

Although this material 12' is conductive through the width (or X direction) of the electrically conductive material, it preferably has some resistance through this width. The resistance protects the system if an accidental short or similar failure of the voltage monitor were to occur. More preferably, the resistance is from about 100 OHMS to about 2000 OHMS; and more preferably, from about 200 OHMS to about 1000 OHMS. A typical open circuit voltage between adjacent plates is about one volt. Thus, the current flow is preferably less than about 10 milliamps to about 0.5 milliamps; and more preferably, from about 5 milliamps to about 1 milliamp.

The selective electrical conductivity may be provided, e.g., by constructing the internally electrically conductive material 12' of alternating cross-sections of electrically conductive elastomeric material with non-conductive elastomeric cross-sections. One particularly preferred connection strip 12 is a solid self supported connector using a carbon based elastomer sold by Fujipoly America Corporation, Carteret, N.J. 07008 under the trade name ZEBRA® Elastomeric Connectors. Of course, other elastomeric connectors 12 may be used, including, e.g., low temperature carbon based elastomers or silver based elastomers.

The width of the segment 22 of the elastomeric strip 12 between the recesses 14 is preferably slightly larger than the width between the opposing side members 24 (or adjacent members) of the cooperating retention recess 20 of the plate 18. This causes the opposing edges and contacts 17 of the elastomeric strip 12 around the recesses 14 to be pushed against the corresponding edges 24 of the retention recess 20 of the plate 18. The opposing recesses 14 of the elastomeric strip 12 include the exposed electrically conductive material 12' providing electrical contacts 17 which are pushed against the adjacent members 24 to provide electrical contacts against the plate 18. Therefore, an electrically conductive path is provided from the plate 18 through contacts 17, through the electrically conductive material 12' of the elastomeric strip 12, through contact member 16 and through the associated wire 28.

In addition, the height of the segment 22 of the elastomeric strip 12 is also preferably slightly larger than that required to cause the electrical contact 16 to rest against the bottom edge 30 of the retention recess 20 of the plate 18. In other words, the distance between the tip of electrical contact 16 against the plate 18 and the upper surface of the elastomeric strip 12 is slightly larger than the distance from the bottom wall 30 of the retention recess 20 to the bottom of the locking protrusions 26 of the retention recess 20. Thus, the elastomeric strip 12 is adapted to push the aligned electrical contact 16 against the plate 18 upon being compressed into the retention recess 20 of the plate 18. Consequently, a segment 22 of the elastomeric strip 12 is confined under compression between two adjacent members 24 to push the electrical contacts 16 against the plate 18 without the requirement of an additional member being moved to provide a force upon the contacts 16, 17. Instead, the force is provided by merely locating the elastomeric member 12 in place, due to the properties of the elastomeric member 12.

It should be understood from the foregoing that the electrically conductive material provides electrical contacts 17 in association with each plate 18. This may be sufficient in many applications. For additional robustness, this embodiment includes the additional electrical contacts 16. This electrical contact member 16 includes a semi-spherical button tip that is in electrical communication with the wire 28. The distal end of the contact member 16 includes a hook or snap-lock shape to help prevent the contact member 16 from being pulled out of the elastomeric strip 12. The contact member 16 is also in electrically conductive contact with the electrically conductive layer 12' of the elastomeric strip 12 to provide an electrical flow path to the wire 28.

Thus, electrically conductive contacts 16, 17 are provided at three points for each of the plurality of closely spaced plates 18; two of the contacts 17 are provided by the electrically conductive layer 12' and one is provided, by the contact member 16. In addition, one of the contacts 16 is against the bottom member 30 of the retention recess 20 and the other two contacts 17 are against side members 24 of the retention recess 20. Thus, one of the electrically conductive contacts 16 is being pushed in a direction which is substantially orthogonal to the direction the other two contacts 17 are being pushed. Preferably, at least one of the contacts is being pushed in a direction which is from about 45 degrees to about 135 degrees to the direction of one of the other contacts; and more preferably, from about 75 degrees to about 105 degrees.

To use the connector of this preferred embodiment, it can be seen that a plurality of electrical contacts 16, 17 are associated with the elongate elastomeric strip 12 and in registration with the plurality of recesses 14. A segment 22 of the elongate elastomeric strip is compressed and placed between a pair of adjacent members of the series of closely spaced plates 18. In this case the adjacent members are the opposing side edges 24 of the retention recess 20 and the segment 22 being compressed is the segment 22 between the pair of recesses 14. In addition, adjacent members are provided by the locking protrusions 26 and the bottom edge 30 of the retention recess 20. As each successive plate 18 is located in the corresponding recesses 14 of the elastomeric member 12, each recess 14 is registered with one of the closely spaced plates 18 by expanding or compressing a segment 23 of the elongate member 12 along its length to align each recess 14 with a corresponding plate 18. In addition, this locates the contacts 16, 17 against the closely spaced plate 18 by allowing the compressed segment 22 of the elastomeric strip 12 to push against the pair of adjacent members 24, 26 and 30, respectively, so that a force results which pushes the contacts 16, 17 against the closely spaced plates 18. In addition, the retention recess 20.of the plate 18 is adapted to prevent removal of the connector 10 from within the recess 20 unless the elongated strip 12 is compressed.

Upon attaching the connector 10 to the closely spaced plates 18, the performance of the entire fuel cell stack (not shown) can be monitored by connecting the wires 28 of the connector 10 to an appropriate cell voltage monitoring device (not shown) using a single part elongated elastomeric strip. The fuel cell stack generally includes a housing and the monitoring device may be encased within its own housing and may be attached to the side of the fuel cell stack. The monitoring device is then electrically connected through a sealed communication port in the monitor housing.

Figure 3:
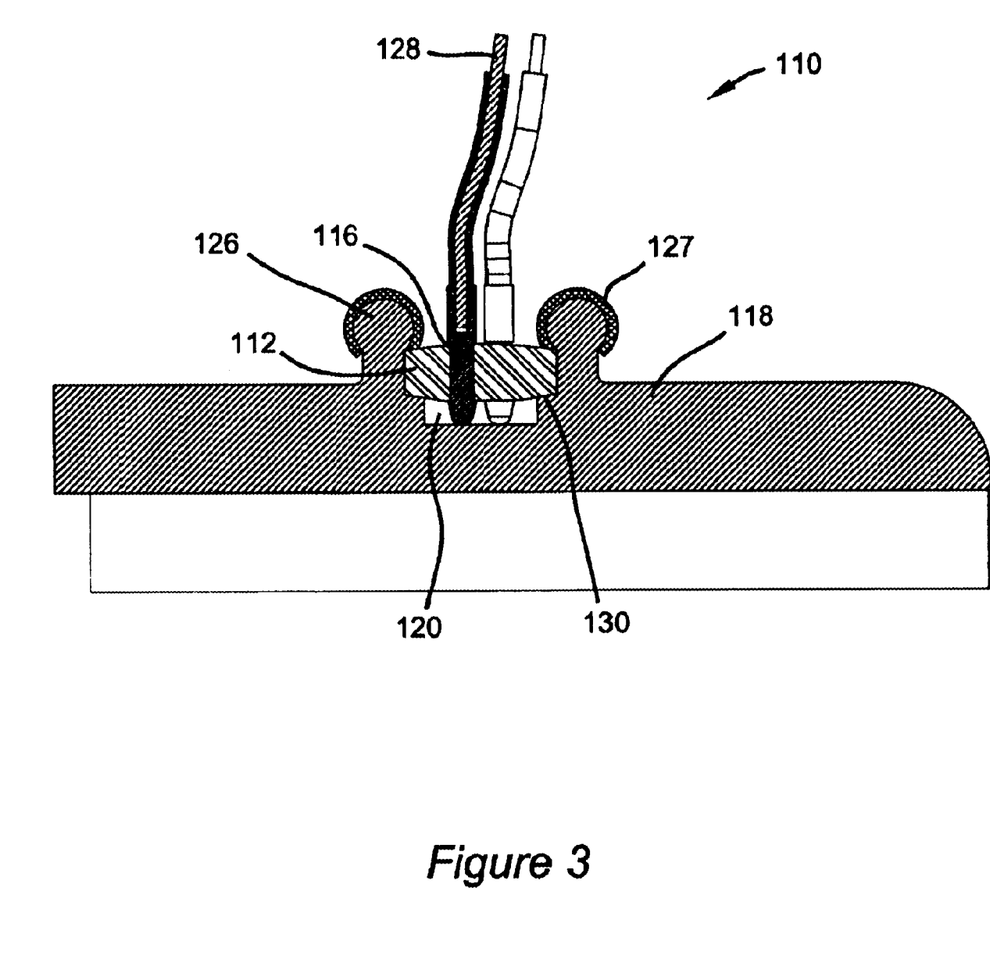
FIG. 3 is a fragmentary cross-sectional view similar to FIG. 2 of an alternative preferred elastomeric connector of the present invention.
Figure 4:
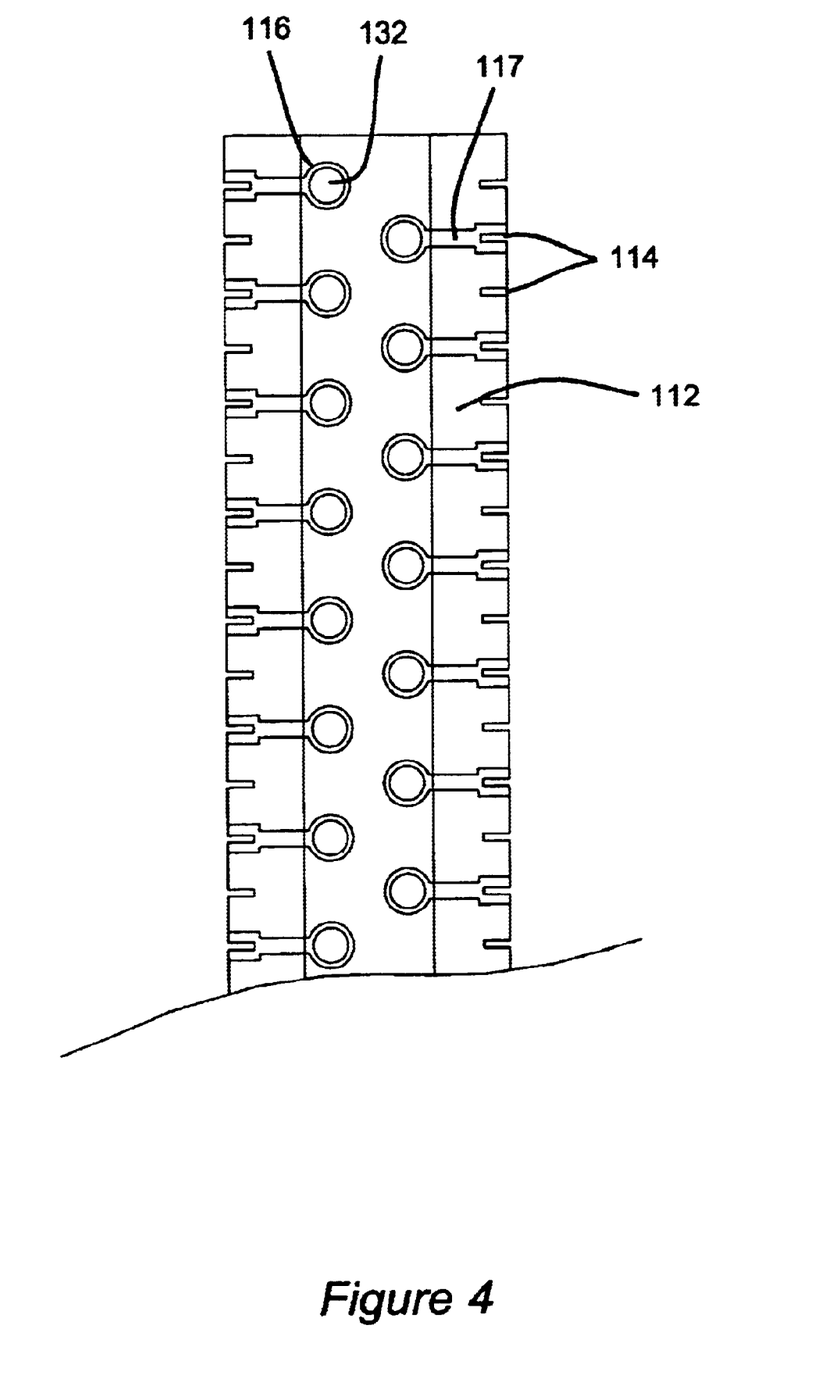
FIG. 4 is a fragmentary bottom plan view of the alternative preferred elastomeric connector of FIG. 3.

Referring to FIGS. 3 and 4, an alternative preferred elastomeric connector 110 of the present invention is provided. In this case, the elastomeric member 112 is provided as single homogeneous material. Preferably, the material is silicone. The upper and lower surfaces of the elastomeric member 112 are outwardly bowed; providing a convex shape in cross-section. This shape results in a smaller contact area being compressed against the bottom edge of the retention recess 120 which can be used to provide increased tolerances and/or to provide increased force between the electrical contact 116 and the plate 118.

The contact member 116 of this embodiment is pushed through an opening in the elongated elastomeric member 112 and adhesively connected to the elastomeric strip 112. The contact member 116 includes an electrically conductive sheath near its distal end. The sheath extends past the distal end of the wire 128 to through the centrally located aperture 132. An additional electrical contact is provided by silk screening electrically conductive elements 117 onto the lower surface of the elastomeric member 112 as seen in FIG. 4. The electrically conductive elements 117 extend from adjacent the recesses 114 to adjacent the electrically conductive sheath of the contact member 116. Consequently, when the connector 110 is located in the retention recess 120, the electrically conductive elements 116 contact with a side 124 of the retention recess 120 around the recess 114 of the elastomeric material 112 and provides an electrical flow path to the wire 128 through the electrically conductive sheath of the contact member 116. In addition, the electrically conductive element 117 silk screened on the elastomeric member 112 additionally contacts the bottom 130 of the retention recess 120 along this flow path providing an additional contact point.

The retention recess 120 of this embodiment provides side edges 124 operating as adjacent members, similar to the previous embodiment. In addition, locking protrusions 126 are provided as generally circularly shaped protrusions 126 of the plates 118. Moreover, additional locking protrusions 127 (or members) are provided by elongated tubular members 127 which are removably attached to the plate 118. The tubular members 127 slide over the rounded locking protrusions 126 associated with the retention recess 120 of each plate 118. With the tubular members 127 in a removed position, the elastomeric strip 112 does not need to be compressed as much during insertion into the retention recess 120. With the tubular members 127 attached in a locked position, however, additional resistance to the connector 110 being pulled from connection with the plates 118 is provided. Thus, the tubular members 127 are adapted to reduce the compression necessary to insert the elastomeric strip 112 in the retention recess 120, without also reducing the retention capabilities of the retention feature. The tubular members 127, when they are attached, reduce the dimension of the retention recess 120 between the rounded protrusions 126.

The tubular members 127 preferably also exert a force against the connector 110 which increases the contact force between the electrical contacts 116, 117 and the plate 118. This force is in addition to the force provided as a result of simply locating the elastomeric strip 112 in the retention recess 120. Thus, the tubular members 127 are preferably adapted to provide an additional force against the connector 110 which increases the contact force of an electrical contact 116, 117. Thus, in this case adjacent members are provided by the side members 124 of the retention recess 120. In addition, the tubular members 127 and the bottom edge member 130 of the retention recess 120 also operate as adjacent members.

Use of the connector 110 of this preferred embodiment is quite similar to that of the previous embodiments. The tubular members 127, operating as locking members, are located in association with the retention recess 120 to reduce a dimension of the opening between the locking members 126; thereby providing increased resistance to removal of the connector 110. In addition, an additional force is provided to push the contact member 116, 117 against the plate member 118 by sliding the tubular members 127 over the corresponding protrusions 126 of the plates 118 to attached the additional locking member 127 to the plate 118. The protrusion 154 on the plate 118 is inserted into the aperture 132 of the contact member 116, providing contact around a 360 degree contact surface. Thus, the surface area of the electrical connection is in a circular shaped surface area; in particular, is has an annular shape.

Figure 5:
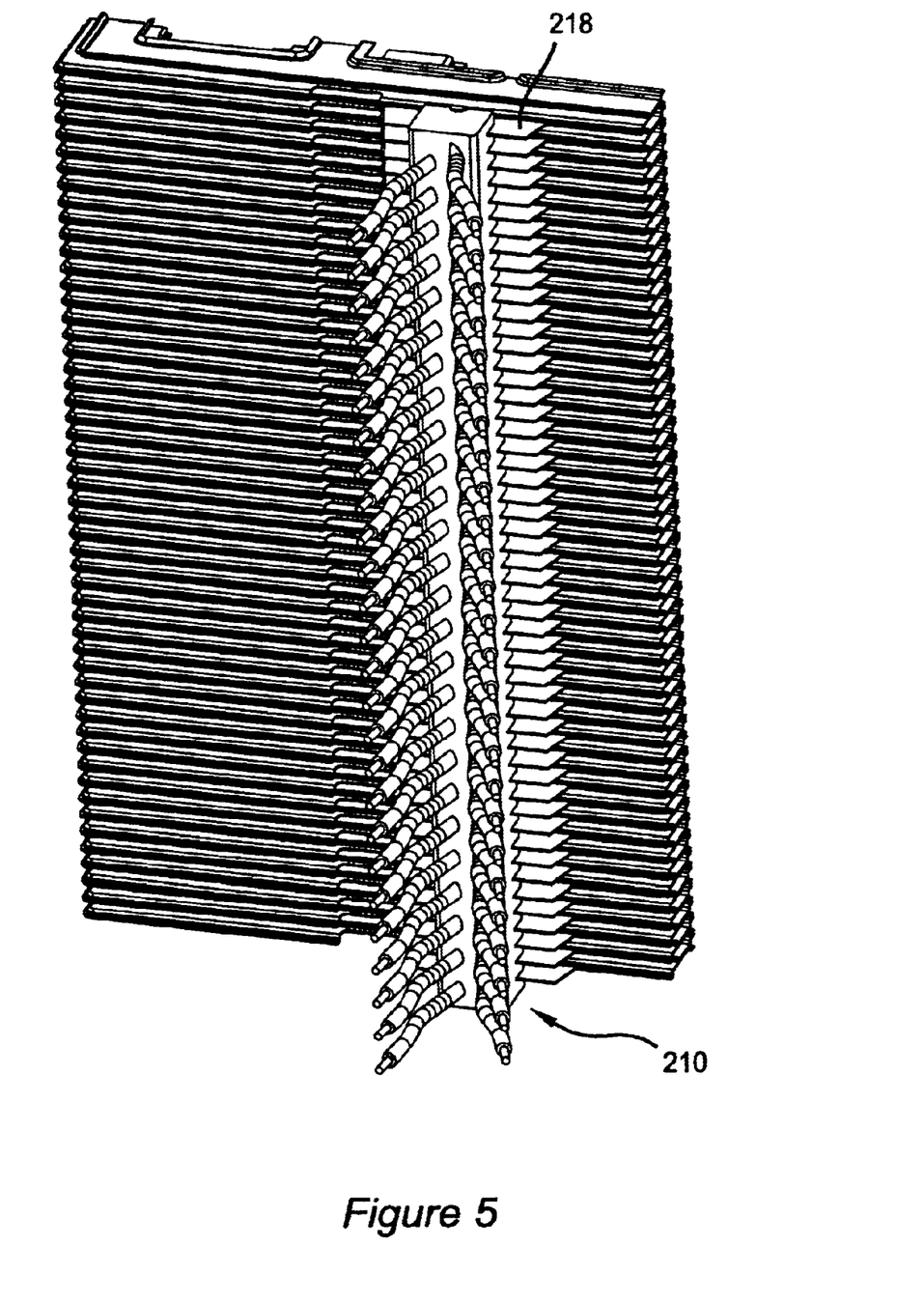
FIG. 5 is a fragmentary perspective view of another alternative preferred elastomeric connector of the present invention.
Figure 6:
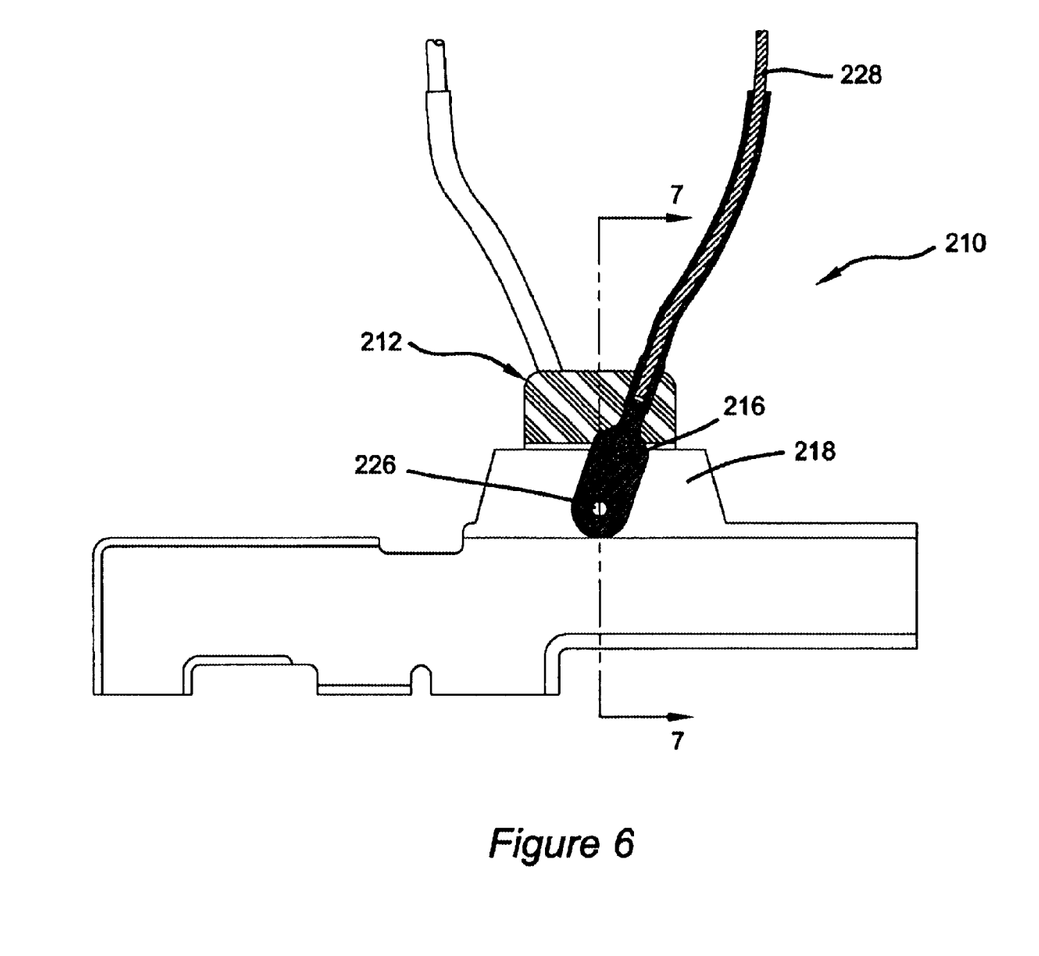
FIG. 6 is a fragmentary cross-sectional view similar to FIG. 2 of the preferred connector of FIG. 5.
Figure 7:
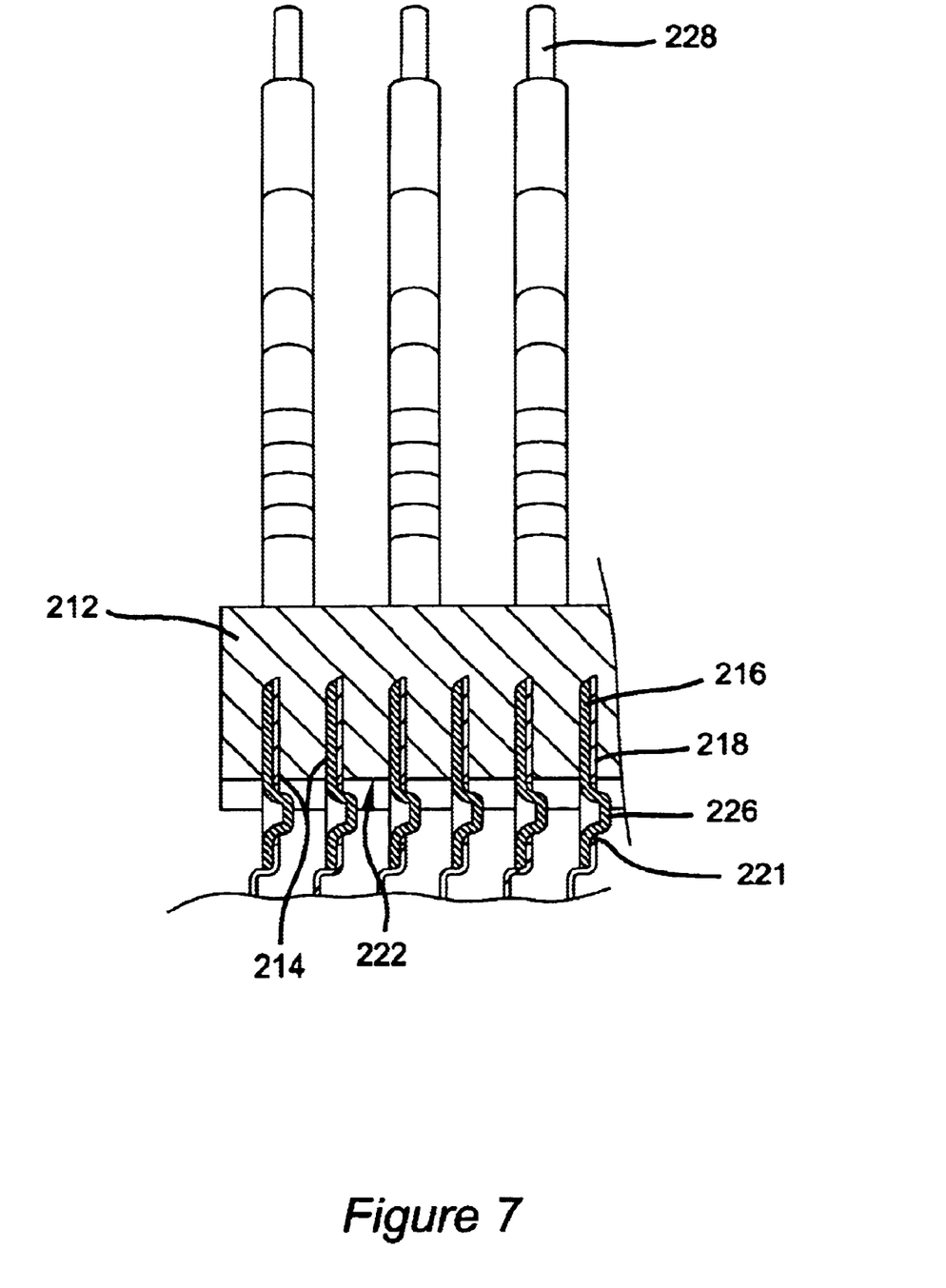
FIG. 7 is a fragmentary cross-sectional view taken along line 7—7 of FIG. 6.
Figure 8:
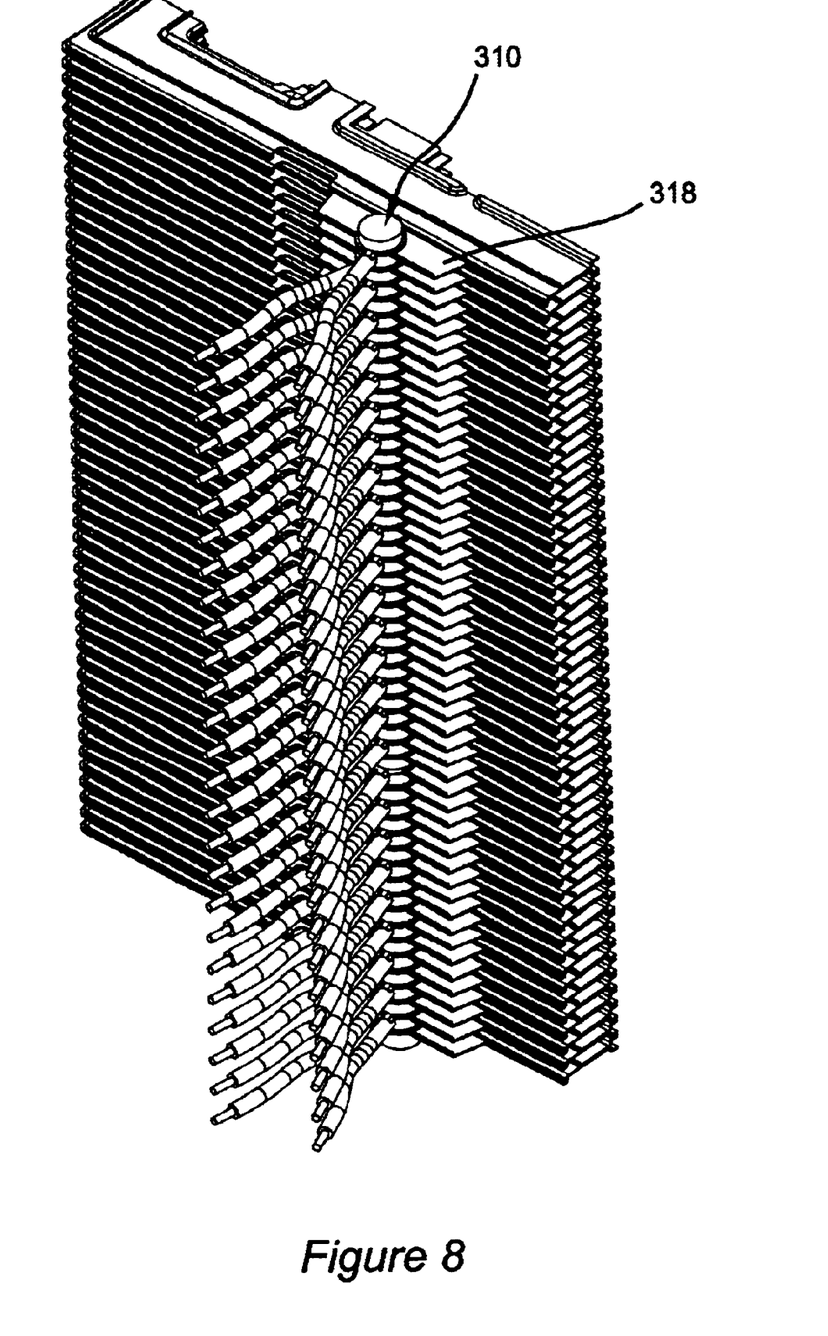
FIG. 8 is a fragmentary perspective view of yet another alternative preferred elastomeric connector of the present invention.
Figure 9:
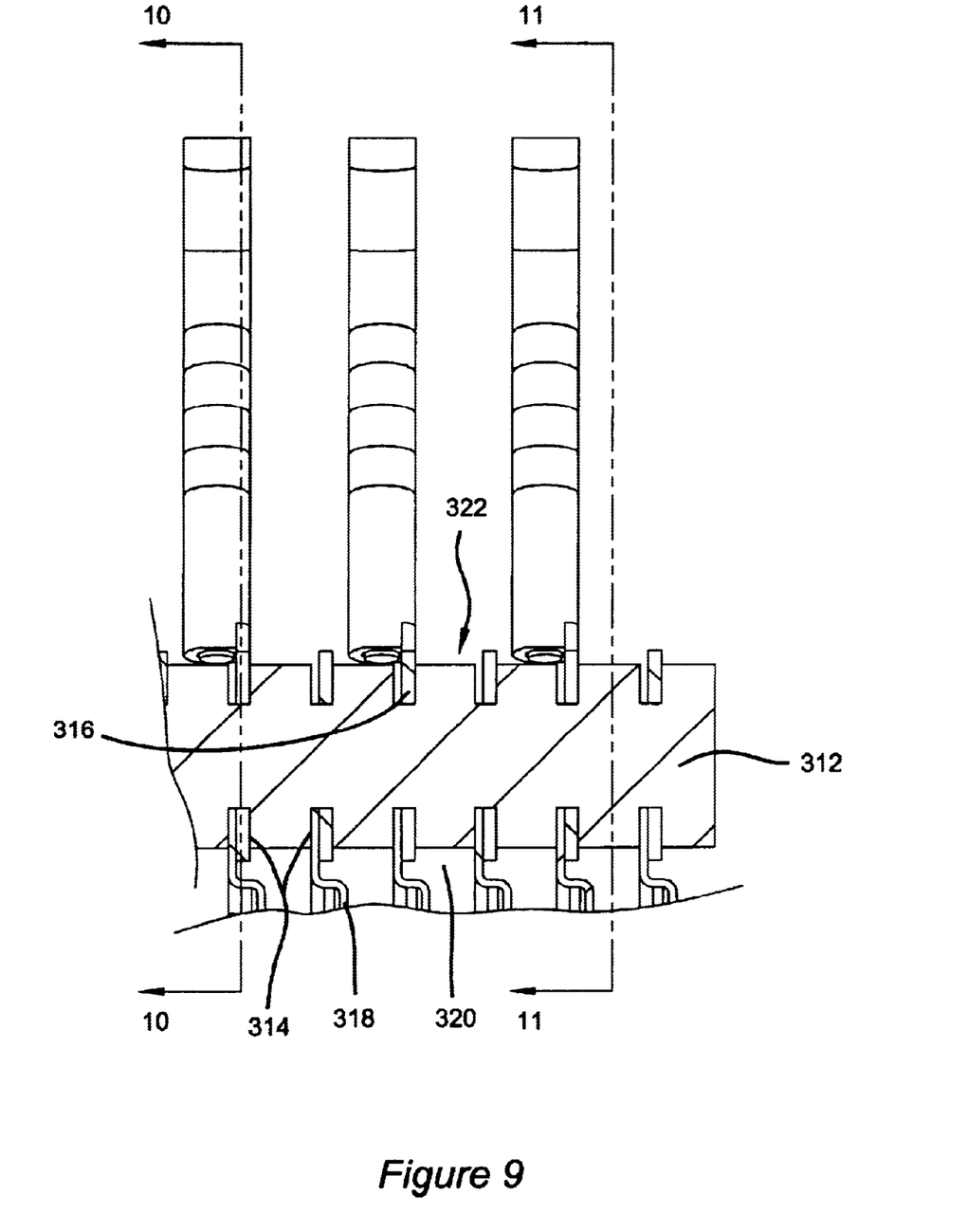
FIG. 9 is a fragmentary longitudinal cross-sectional view similar to FIG. 7 of the alternative preferred elastomeric connector of FIG. 8.
Figure 10:
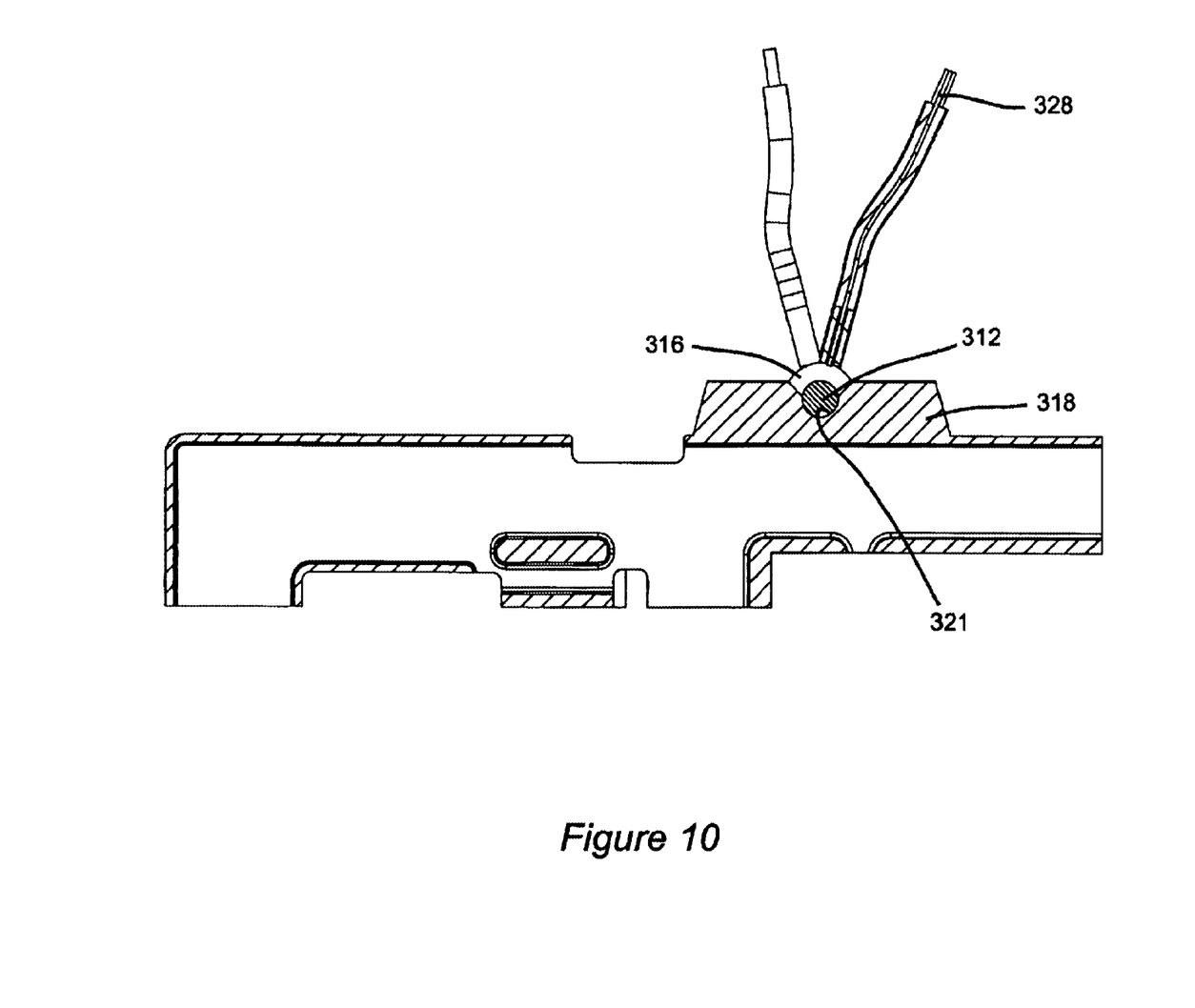
FIG. 10 is a fragmentary cross-sectional view taken along line 10—10 of FIG. 9.
Figure 11:
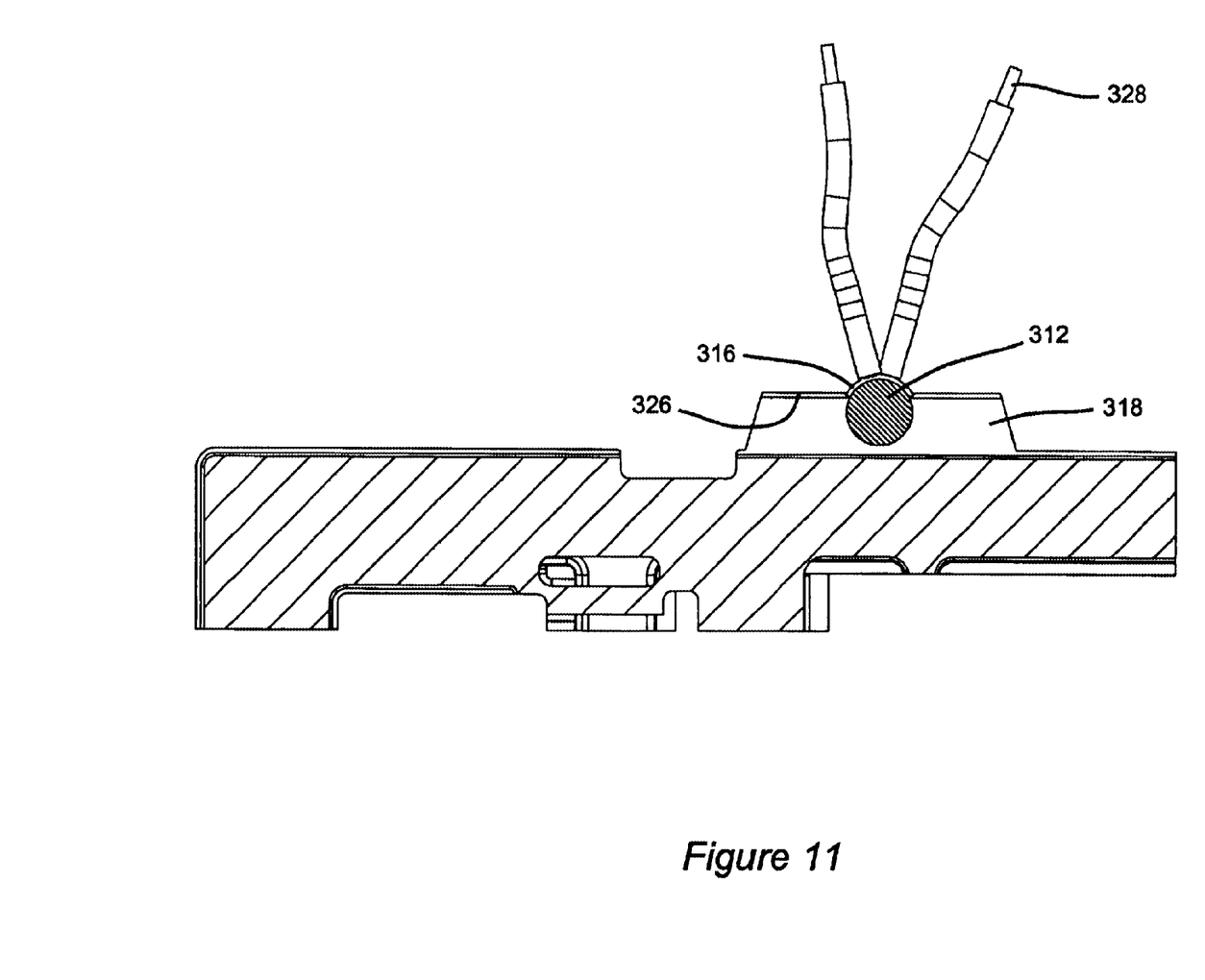
FIG. 11 is a fragmentary cross-sectional view taken along line 11—11 of FIG. 9.

Referring to FIGS. 5, 6 and 7, another alternative preferred embodiment of the connector 210 of the present invention is illustrated. The elongated elastomeric strip 212 includes recesses 214 arranged transversely through the lower half of the elastomeric strip 212. Located in the recesses 214 and adhesively attached to one side wall of the recess 214 is the electrical contact member 216. The contact member 216 is a spade connector attached to a wire 228 as is commonly known in the art. The spade connector 216 has a raised protrusion 226 on one surface, operating as a locking protrusion, which is adapted to cooperate with an aperture 221, operating as a part of the retention recess, in the plate 218. Thus, in this embodiment, it is the raised protrusion 226 of the contact member 216 which is located in the retention recess 221 along with the elastomeric strip 212.

As with the previous embodiments, the segment 222 of material between successive recesses 214 of the elastomeric strip 212 is compressed between two adjacent members. In this case, the two adjacent members between which the elastomeric member is compressed, are two adjacent plates 218. As used herein, "adjacent" simply means in close proximity thereto. "Adjacent" does not necessarily require that the members or plates be located consecutively next to each other in the fuel cell stack. Consequently, as adjacent plates 218 are inserted into adjacent recesses 214 of the elongated elastomeric strip 212, the segment 222 of the strip between the recesses 214 is compressed between the plates 218. This compression causes the elastomeric strip 212 to exert a force on the contact member 216 and push it against the plate 218 providing an electrical connection therewith. In addition, once the connector 210 is appropriately located, the protrusion 226 of the contact member 216 is pressed into the aperture 221 with which it cooperates to retain the connector 210 in place and maintain the electrical connection. Thus, the protrusion 226 of the contact member 216 operates as a retention member.

Use of the connector 210 of this embodiment is similar to that previously described. As indicated above, however, retaining the connector 210 against the plate 218 is accomplished by providing the contact member 216 with a protrusion 226 and the plate 218 with a cooperating retention recess 221. Thus, instead of locating a segment of the elastomeric member 212 in the retention recess 221, a part of the contact member 226 is located in the retention recess 221. Further, the retention of the connector 210 to the plate 218 is accomplished by using the same force which pushes the contact member 216 against the plate 218.

Referring to FIGS. 8 through 11, yet another alternative preferred embodiment of a connector 310 of the present invention is illustrated. The elongated elastomeric strip 312 of this embodiment has a generally circular cross-section. The recesses 314 extend transversely across the strip 312 around its periphery. Located in the recesses 314 and adhesively attached to one side wall of the recess 314 is the electrical contact member 316. The contact member 316 is an annularly shaped member which is attached to the wire 328.

As with the previous embodiment, the two adjacent members between which the segment 322 of the elastomeric member 312 is compressed are two adjacent plates 318. Consequently, as adjacent plates 318 are inserted into adjacent recesses 314 of the elongated elastomeric strip 312, the segment 322 of the strip 312 between the recesses 314 is compressed between the plates 318. This compression causes the elastomeric strip 312 to exert a force on the contact member 316 and push it against the plate 318 providing an electrical connection therewith.

A locking protrusion 326 is provided along the upper edge of the plates 318 adjacent the aperture 321 in the form of a protruding lip 326. Once the connector 310 is appropriately located, the central portion of the elastomeric strip 312 is pressed into the aperture 321, and the locking lip 326 provides an obstruction to hinder removal of the connector 310, unless the elastomeric strip 312 is compressed so it may move past the locking protrusion 326. In addition, the locking lip 326 operates as a locking member which cooperates with the top of the elastomeric strip 312 to provide the locking function. Thus, these features cooperate together to help hold the connector 310 in place. The contact member 316 and the elastomeric strip 312 are both located within the retention recess 320 of this embodiment. Use of the connector 310 of this embodiment is substantially identical to use of the previously described embodiment. Thus, the process is not repeated here.

Of course, many alternative embodiments of the present invention are possible over those which have been specifically described above. For example, with respect to the preferred embodiment of FIGS. 1 and 2, the electrical contact could extend only to the middle, electrically conductive, layer and rely only on the side electrical contacts provided by the electrically conductive material of the elastomeric strip. With respect to the preferred embodiment of FIGS. 3 and 4, the removable locking member may not provide any additional compressive force upon the connector. With respect to the preferred embodiment of FIGS. 5, 6 and 7, the location of the protrusion and cooperating recess may be reversed; placing the protrusion on the plate and the recess located on the contact member. With respect to FIGS.

8 through 11, the aperture of the plate may be completely surrounded by material of the plate so that it can provide a complete locking function, thereby possibly enabling eliminating the locking protrusion. In addition, with respect to any embodiment, instead of using substantially perpendicular adjacent members and separate locking protrusions, adjacent members which are angled toward each other could be used.

The description of the invention is merely exemplary in nature and, thus, variations that do not depart from the gist of the invention are intended to be within the scope of the invention. Such variations are not to be regarded as a departure from the spirit and scope of the invention. Accordingly, the present invention covers all modifications within the scope of the appended claims.

What is claimed is:

1. A connector for electrically connecting to a series of closely spaced plates having a substantially uniform spacing therebetween, the connector comprising:
    a plurality of recesses located along the length of an elongated elastomeric member; and
    a plurality of electrical contacts, each of the plurality of contacts being associated with the elastomeric member in registration with one of the plurality of recesses;
    wherein the elongated elastomeric member is adapted to expand or compress along its length to receive one of the closely spaced plates in each of the plurality of recesses and to thereby register each of the plurality of electrical contacts with a corresponding contact point on one of the closely spaced plates.

2. A connector according to claim 1, wherein the plurality of recesses includes a plurality of pairs of recesses, each of the plurality of pairs of recesses include one of the pair of recesses being located in a first side of the elongated member and being aligned with the other of the pair of recesses located in an opposite side of the elongated member.

3. A connector according to claim 1, wherein the plurality of recesses are located in a bottom side of the elongated member.

4. A connector according to claim 1, wherein at least one of the plurality of electrical contacts is located in one of the plurality of recesses.

5. A connector according to claim 1, wherein the elongated elastomeric member includes electrical conductivity from a first side thereof to an opposite side thereof, but not having meaningful conductivity in use along its elongated length, and wherein at least one of the plurality of electrical contacts is associated with the part of the elongated elastomeric member.

6. A connector according to claim 5, wherein the electrical conductivity from a first side thereof to an opposite side thereof has an electrical resistance which is from about 100 OHMS to about 2000 OHMS.

7. A connector according to claim 1, wherein at least one of the plurality of contacts in contact with a plate is substantially orthogonal to at least one of the other of the plurality of contacts in contact with the same plate.

8. A connector according to claim 1, wherein at least one of the plurality of electrical contacts includes a contact member which extends through the elastomeric member.

9. A connector according to claim 1, further comprising a locking member removably attached to one of the closely spaced plates or the contact member which is adapted to hinder the removal of the connector from the series of closely spaced plates.

10. A connector according to claim 1, wherein a segment of the elastomeric member is compressed between a pair of adjacent members, the pair of adjacent members being a pair of adjacent plates or two members of a single plate.

11. A connector for electrically connecting to a plurality of closely spaced plates having a substantially uniform spacing therebetween, the connector comprising:
    (a) an elongated elastomeric member having a plurality of recesses, the plurality of recesses each being associated with one of the closely spaced plates; and
    (b) a plurality of electrical contacts, the plurality of electrical contacts being associated with the elastomeric member in registration with one of the plurality of recesses;
    wherein the elongated elastomeric strip is adapted to adjust to any tolerance variation in the substantially uniform spacing between the plates and wherein a segment of the elastomeric strip is confined under compression between two adjacent members, the two adjacent members being either two adjacent closely spaced plates or two adjacent members of a single plate.

12. A connector according to claim 11, further comprising an locking member associated with the adjacent members which resist removal of the part of the connector unless the elongated elastomeric strip is compressed and wherein the locking member is removably attached to the series of closely spaced plates.

13. A connector according to claim 11, wherein the elastomeric member is adapted such that its being confined under compression generates a force which pushes at least one of the plurality of contact points in a first direction against a plate.

14. A connector according to claim 13, wherein the elastomeric member is adapted such that its being confined under compression generates a force which pushes at least another one of the plurality of contact points in a direction which is substantially orthogonal to the first direction.

15. A connector according to claim 11, wherein one of the adjacent members or the contacts has a retention recess which is adapted to cooperate with a locking protrusion in the other of the adjacent members or the contacts.

16. A connector according to claim 11, wherein the plurality of recesses includes a plurality of pairs of recesses, each of the plurality of pairs of recesses include one of the pair of recesses being located in a first side of the elongated member and being aligned with the other of the pair of recesses and located in an opposite side of the elastomeric member.

17. A connector according to claim 11, wherein the plurality of recesses are located in a bottom side of the elastomeric member.

18. A connector according to claim 11, wherein at least one of the plurality of electrical contacts is located in one of the plurality of recesses.

19. A connector according to claim 11, wherein the elongated elastomeric member has electrical conductivity from a first side thereof to an opposite side thereof, but not having meaningful conductivity in use along its elongated length, and wherein at least one of the plurality of electrical contacts is associated with the part of the elongated elastomeric member.

20. A connector according to claim 19, wherein the electrical conductivity from a first side thereof to an opposite side thereof has an electrical resistance which is from about 100 OHMS to about 2000 OHMS.

* * * * *